United States Patent [19]

Newman

[11] 4,238,117
[45] Dec. 9, 1980

[54] RAILING AND METHOD OF MAKING THE SAME

[76] Inventor: Don Newman, 501 W. Hortter St., Philadelphia, Pa. 19119

[21] Appl. No.: 938,567

[22] Filed: Aug. 31, 1978

[51] Int. Cl.² ............................................. F16B 7/08
[52] U.S. Cl. .................................. 256/65; 403/190; 403/271
[58] Field of Search .................... 256/65, 59; 403/190, 403/191, 237, 234, 199, 192, 235, 270, 271, 272

[56] References Cited

U.S. PATENT DOCUMENTS

| 500,941 | 7/1893 | Perkins | 403/190 |
|---|---|---|---|
| 1,840,048 | 1/1932 | Michelman | 256/65 X |
| 1,966,403 | 7/1934 | Durham | |
| 2,101,707 | 12/1937 | Ewing | |
| 2,150,651 | 3/1939 | Ewing | |
| 2,242,427 | 5/1941 | Heanue | 256/65 |
| 2,834,621 | 5/1958 | Schroer | 256/65 X |
| 3,039,799 | 6/1962 | Gerace | 256/65 X |
| 3,594,025 | 7/1971 | Wagner | 403/190 |
| 3,598,433 | 8/1971 | Savickas | 403/190 |
| 3,787,033 | 1/1974 | Snyder | 256/59 |

Primary Examiner—Andrew V. Kundrat
Attorney, Agent, or Firm—Seidel, Gonda, Goldhammer & Panitch

[57] ABSTRACT

A post member and a rail member are joined together by a short hollow fitting. The fitting has a head shaped to mate with one of said members. A fitting is welded to each of the members.

24 Claims, 14 Drawing Figures

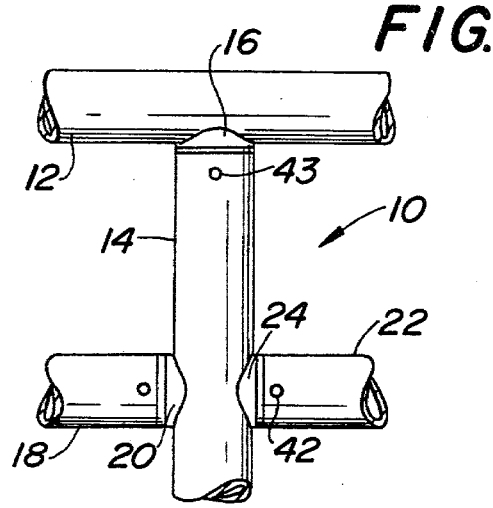
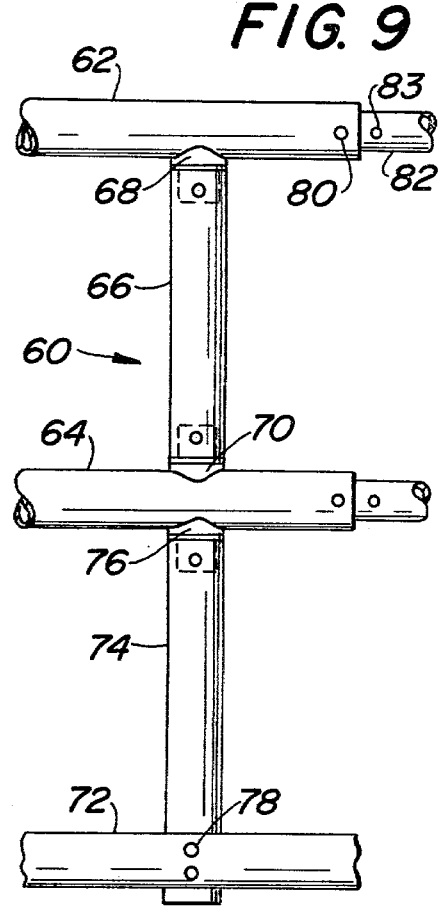
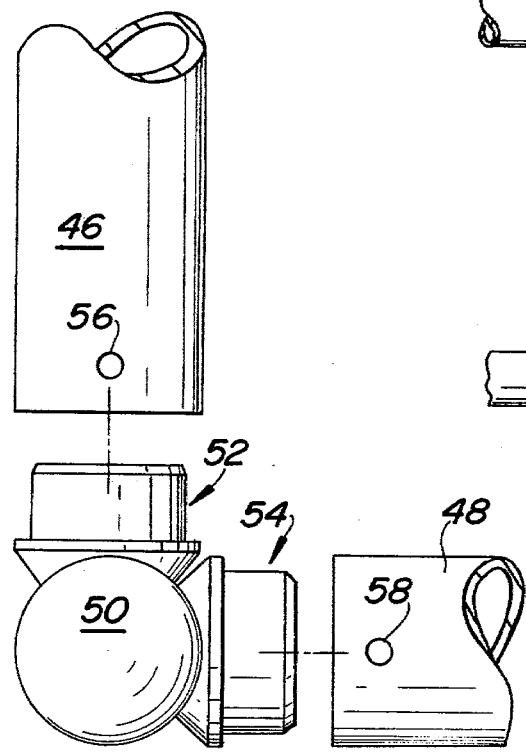

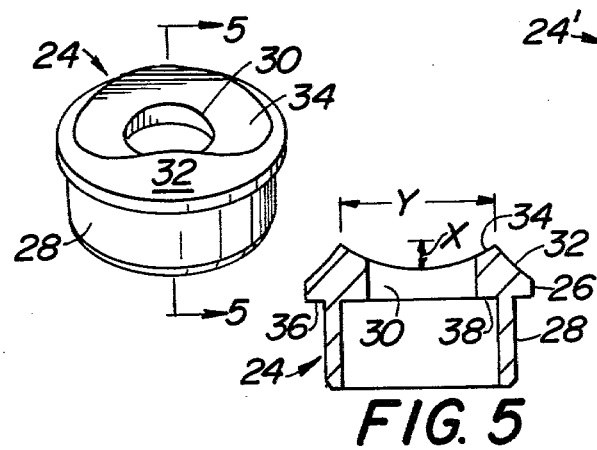
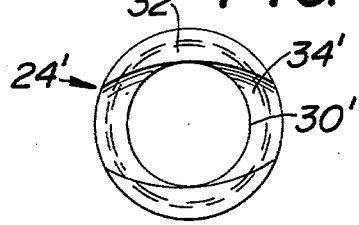
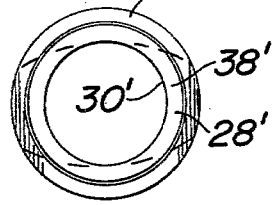
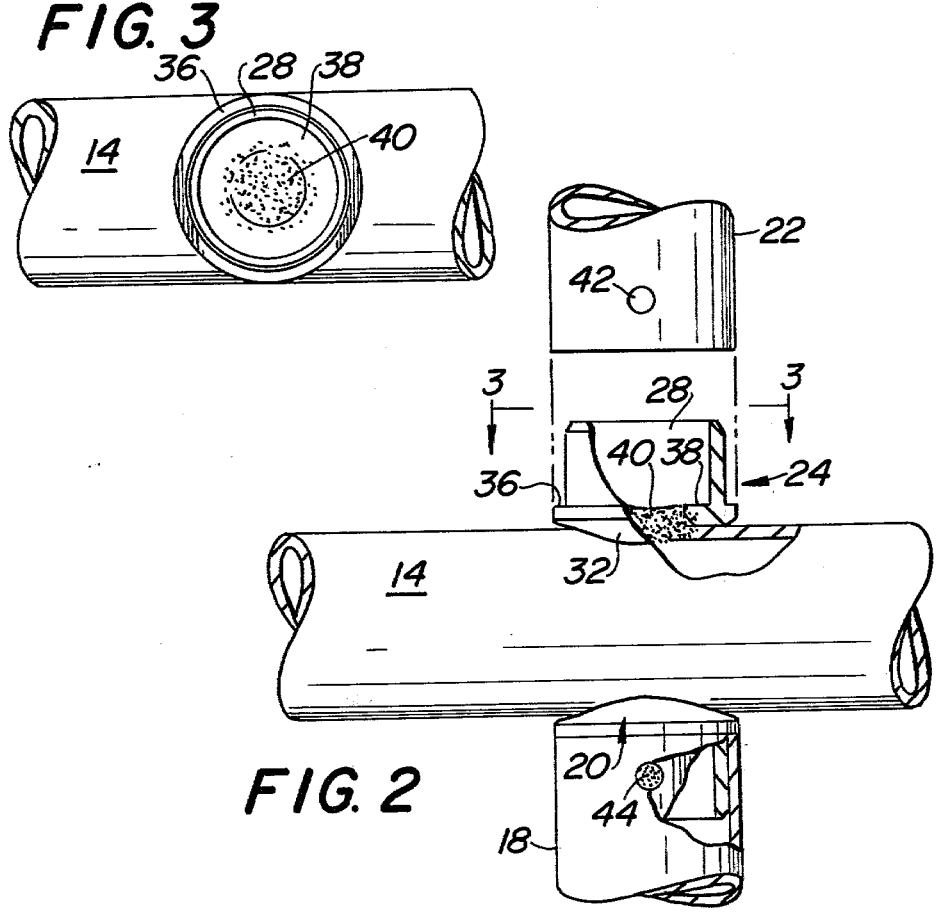

RAILING AND METHOD OF MAKING THE SAME

BACKGROUND

A number of railings and methods of making the same have been proposed heretofore. One method used heretofore is taught by U.S. Pat. No. 2,126,519. That patent teaches a railing constructed by the cope and weld method. That method involves punching or otherwise forming one end of a tubular member so as to form a cope and then the outer periphery of the cope is welded to the other member.

Another method proposed heretofore is taught by U.S. Pat. Nos. 2,150,651 and 3,787,033 wherein the rail and post members are interconnected by a fitting which embraces approximately 180° of the periphery of the post member and is internally tack welded thereto. The fitting is comprised of a leg and internal cylindrical retainer sleeve. A rail member in U.S. Pat. No. 3,787,033 is joined to said sleeve by an epoxy adhesive. Railings in accordance with the last-mentioned two patents have various objections related to cost of manufacturing the same due to the machining involved therein, drilling of holes in the top rail, the finishing steps involved therein, and do not provide waterproof joints whereby they are limited to railings of non-ferrous materials.

SUMMARY OF THE INVENTION

The railing of the present invention includes at least one post member and at least one rail member at an angle thereto. A short hollow fitting is provided. The fitting is an integral one piece fitting having a head at one end and an extension portion at its other end. The head has an end face shaped to mate with and be in contact with the outer periphery of one of said members. A weld inside the head joins the head end face to said one member with a waterproof joint. The weld is exposed only on the inner periphery of the fitting. The other of said members is telescoped with respect to said extension portion and joined thereto such as by press fit and/or welding.

It is an object of the present invention to provide a novel railing and method for making the same.

It is another object of the present invention to provide a novel railing having waterproof welded joints and structurally interrelated in a manner so as to materially decrease the cost of manufacturing the same out of ferrous and non-ferrous metals.

It is another object to provide a novel railing and method of making the same which is adaptable for use with post and rail members which are hollow with minimal distortion resulting from the welded joint interconnecting the same.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a partial side elevation view of a railing in accordance with an embodiment of the present invention.

FIG. 2 is an enlarged showing of a portion of FIG. 1.
FIG. 3 is a view taken along the line 3—3 in FIG. 2.
FIG. 4 is a perspective view of one type of fitting used in accordance with the present invention.

FIG. 5 is a sectional view taken along the line 5—5 in FIG. 4.

FIG. 6 is a top plan view of another fitting in accordance with the present invention.

FIG. 7 is a bottom plan view of the fitting shown in FIG. 6.

FIG. 8 is an exploded view showing mutually perpendicular rail members connected to a post member.

FIG. 9 is a partial side elevation view of a railing in accordance with another embodiment of the present invention.

Figure 10:
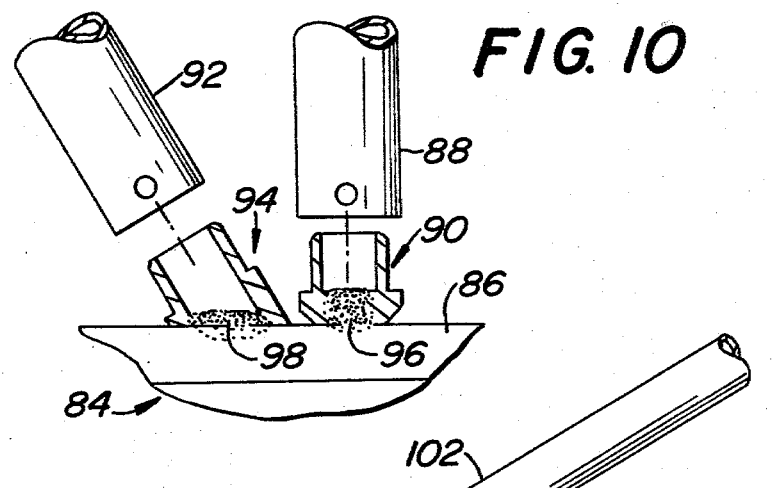
FIG. 10 is an exploded view of a railing made in accordance with another embodiment of the present invention.

Referring to the drawings in detail, wherein like numerals indicate like elements, there is shown in FIG. 1 a portion of a railing in accordance with the present invention designated generally as 10. The railing 10 includes a hollow top rail member 12 connected to the upper end of a hollow post member 14 by way of a fitting 16. One end of a hollow rail member 18 is connected to the post member 14 by way of a fitting 20. The other end of rail member 18 is connected to a post similar to post member 14. One end of a hollow rail member 22 is connected to post member 14 by way of a fitting 24 so as to be diametrically opposite rail member 18. Rail members 18 and 22 need not be coaxial as shown.

Each of the fittings 16, 20 and 24 are identical. Hence, only fitting 24 will be described in detail. Referring to FIGS. 2, 4 and 5, the fitting 24 includes a cylindrical head 26 having a reduced diameter extension portion 28 extending from one end thereof and coaxial therewith. Portion 28 is hollow. The other end of the head 26 is provided with a tapered portion 32 which merges into the end face 34. The head 26 is provided with a coaxial hole 30. Head 26 has a shoulder 36 radially outwardly from the portion 28 and a shoulder 38 radially inwardly of the portion 28.

The end face 34 is concave and elliptical in plan view. The depth of the concave end face 34 is designated as X in FIG. 5 and the minor diameter of the elliptical surface 34 is designated Y. The ratio of X divided by Y is preferably less than about 0.25 whereby fittings are formed from a minimal amount of material. Fitting 24 is preferably made of metal such as aluminum or steel. The rail members are preferably made from the same material as their fittings.

The fittings 20 and 24 are preferably welded so as to be diametrically opposite one another as shown in FIG. 2. Each of the rail members 18, 22 has a hole 42 adjacent one end. Post member 14 has a similar hole 43. The outer diameter of the head 26 matches the outer diameter of the rail members 18, 22. The fittings 20, 24 are welded to the post member 14. The weldment is designated 40. For hard to weld materials, weld 40 may be extended over shoulder 38 to provide a mechanical lock.

Thereafter, the rail members 18, 22 are arc spot welded to their associated fitting by way of hole 42. The weldment filling the hole 42 is designated 44. Post member 14 is similarly welded to fitting 16 via hole 43. Arc spot weld 44 is a uniform weld button that is produced flush or nearly flush with the outer peripheral surface of the rail or post member at hole 42 whereby no finishing steps on steel railings are required. Minor finishing may be required on aluminum.

In FIG. 6, there is shown another embodiment of the fitting and designated 24'. Fitting 24' is the same as fitting 24 except as will be made clear hereinafter. Hence, corresponding structure is provided with corresponding primed numerals. The fitting 24' has a hole 30' which corresponds to the inner diameter of the extension portion 28'. Thus, the diameter of hole 30' corresponds to the dimension Y. Otherwise, fitting 24' is identical with fitting 24. Other variations in the fittings are possible such as elimination of hole 30.

The fitting 24' constitutes a means for increasing the size of the weld. That is, hole 30' is larger than hole 30 and will provide a much stronger weld due to the larger size of the weld area. The welds 40 are attained by introducing a welding device through the hollow extension portion 28 on the fittings. Weld 40 is completely concealed in the assembled railing. The connection between post member 14 and rail member 22, for example, is completely waterproof whereby no water may enter into the rail member 22 or post member 14 at the joint. Due to the localized nature of the welds, such as weld 40, there is minimal bending or distortion of the post member 14 or rail member 12. The welds 40 and 44 are preferably manual arc, MIG, or arc spot welds. The fittings may be machined, cast or forged. Steel fittings are cheaper when machined on high speed production line equipment and aluminum fittings are cheaper when cast.

Referring to FIG. 8, the fittings of the present invention enable two rail members to be perpendicular to one another and connected to a post member. Rail member 46 is connected to post member 50 by way of fitting 52. Rail member 48 is connected to post member 50 by way of fitting 54. The fittings 52, 54 are identical with fitting 24. The preferred included angle of the tapered portion 32 on fitting 24 may vary from 30° to 65° with respect to its axis but preferably is about 40° to 65° when used in the arrangement of fittings 52, 54. Rail member 46 has a hole 56 to facilitate welding the same to the fitting 52 in the manner described above. Likewise, rail member 48 has a hole 58 to facilitate welding the same to the fitting 54 as described above.

In FIG. 9, there is illustrated a portion of railing in accordance with the present invention designated generally as 60. The railing 60 includes an upper rail member 62 connected to a lower parallel rail member 64 by way of a post member 66 which extends therebetween. Post member 66 is connected to the rail member 62 by way of fitting 68 and is connected to the rail member 64 by a fitting 70. Fittings 68, 70 are identical with fitting 24 or 24'.

The railing 60 includes a longitudinally extending guard plate 72 at the lower end thereof. Guard plate 72 is connected to the rail member 64 by way of post members 74 and fitting 76. Guard plate 72 has holes 78 to facilitate provision of a weld, preferably an arc spot weld, which joins the guard plate to the post 74. Each of the post members 66, 74 are connected to their associated fittings by way of a press fit and/or by an arc weld through a hole in the post member as described above, for example, in connection with hole 42.

In order to interconnect one railing section with another in the field, there is shown in FIG. 9 one end of the rail members 62, 64. Adjacent the end, rail member 62 is provided with a hole 80. Hole 80 facilitates providing a weld between one end of rail member 62 and a pipe 82. Pipe 82 is of short length and may have a prepunched hole 83. Pipe 82 extends into the rail member 62 and into a comparable rail member to be joined end to end with rail member 62. The comparable rail member has a hole 80 to facilitate receiving a rivet or other fastener which also enters hole 83. Hole 83 may be eliminated if it is desired to plug weld the comparable rail member to pipe 82 in the field. Rail member 64 is similarly constructed.

In FIG. 10, there is illustrated a portion of a railing 84. The railing 84 includes a rail member 86 whose surface and cross-section is substantially different from that of the post members to be connected thereto. Thus, rail member 86 has a flat upper surface to which is connected a vertically disposed post member 88 by way of fitting 90. An upright post member 92 is connected to the rail member 86 by way of fitting 94. Fitting 90 is identical with fitting 24 except that the end face matches the contour of the juxtaposed surface of rail member 86 and therefore is also flat. The weld joining fitting 90 to rail member 86 is designated 96.

The fitting 94 is identical with the fitting 24' except that the end face is flat and beveled at an angle with respect to the longitudinal axis of the fitting. The weld joining the fitting 94 to the rail member 86 is designated 98. Each of the post members 88 and 92 are connected to their associated fittings in the same manner as described above. It will be noted that the fitting 94 as illustrated does not have a tapered portion on the head but may be provided with the same.

Figure 11:
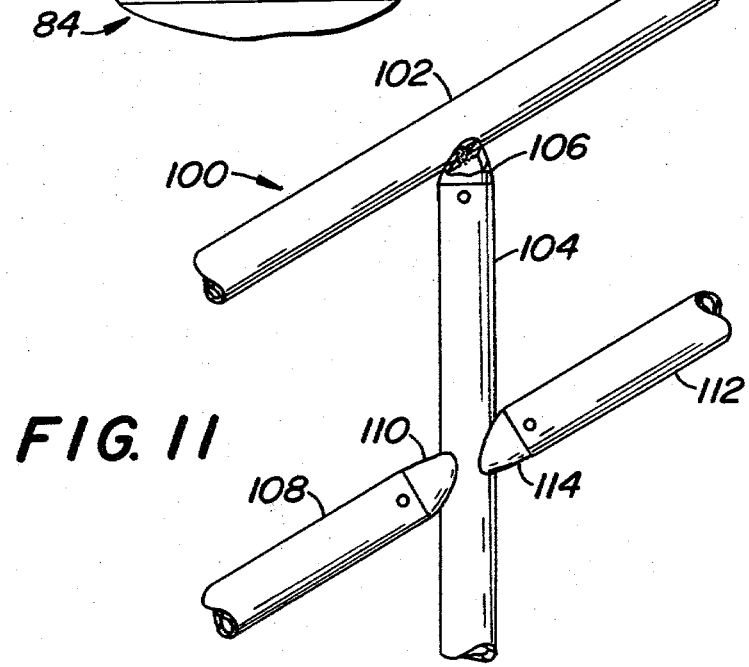
FIG. 11 is a partial side elevation view of another railing in accordance with the present invention.

Referring to FIG. 11, there is illustrated a portion of railing 100 in accordance with another embodiment of the present invention. Railing 100 includes an angularly disposed rail member 102 connected to the upper end of a vertically disposed post member 104 by way of a fitting 106. Rail member 108, parallel to rail member 102, is connected to the post 104 by way of fitting 110. Rail member 112, parallel to rail member 102 and diametrically opposite rail member 108, is connected to the post member 104 by way of a fitting 114. The fittings 106, 110 and 114 are identical.

Figure 12:
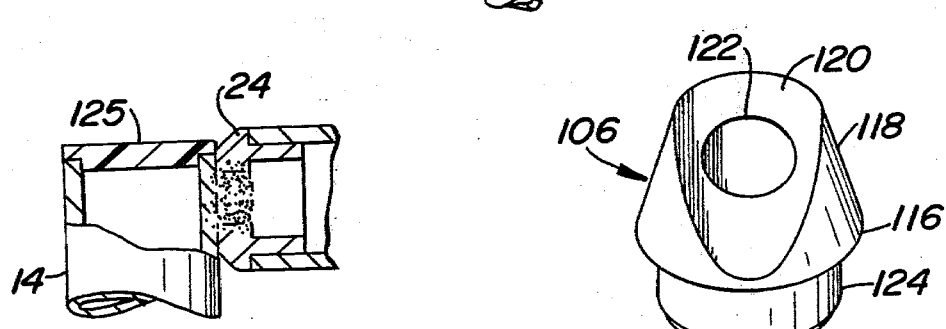
FIG. 12 is a perspective view of the fitting shown in FIG. 11.

Referring to FIG. 12, the fitting 106 includes a head 116 having a tapered surface 118 extending to an end face 120. The end face 120 is a concavity having the shape shown in FIG. 12 and which is generally elliptical in plan view. The concavity is at an angle with respect to the longitudinal axis of the head and has a hole 122 corresponding to hole 30. At the opposite end of the fitting from the end face 120, there is provided an extension portion 124 corresponding to extension portion 28. If necessary to facilitate introducing the welder into member 124, the latter may be notched. Internally, fitting 106 has the features shown in FIGS. 5, 6 or 7 on the fitting 24 or 24'.

The rail member 112 is welded to its fitting 114 by way of a hole in the rail member 112 as described above. Rail member 108 is similarly connected to its fitting 110. The post member 104 is similarly connected to its fitting 106.

The present invention is adapted for use with horizontally disposed railings as shown in FIGS. 1 and 9, accommodates the need for right angle portions as shown in FIG. 8, facilitates joining the railing to flat surfaces in a vertical or angularly disposed disposition shown in FIG. 10, and can accommodate an angularly disposed railing as shown in FIG. 11. In addition, the railings of the present invention are adapted for semi-automated manufacturing techniques to minimize the costs thereof.

Figure 14:
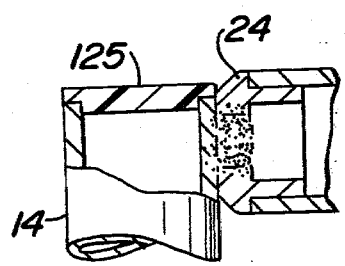
FIG. 14 is a sectional view of a rail member and fitting connected to the upper end of a post member.

As shown in FIG. 14, when fitting 24 is welded to the upper end of post member 14, the head of fitting 24 projects above the post member 14. However, the weld does not extend to the upper edge of the post member 14. It is undesirable to provide a weld at the upper edge of post member 14. A cap member 125 may be provided without interference with the fitting 24.

Figure 13:
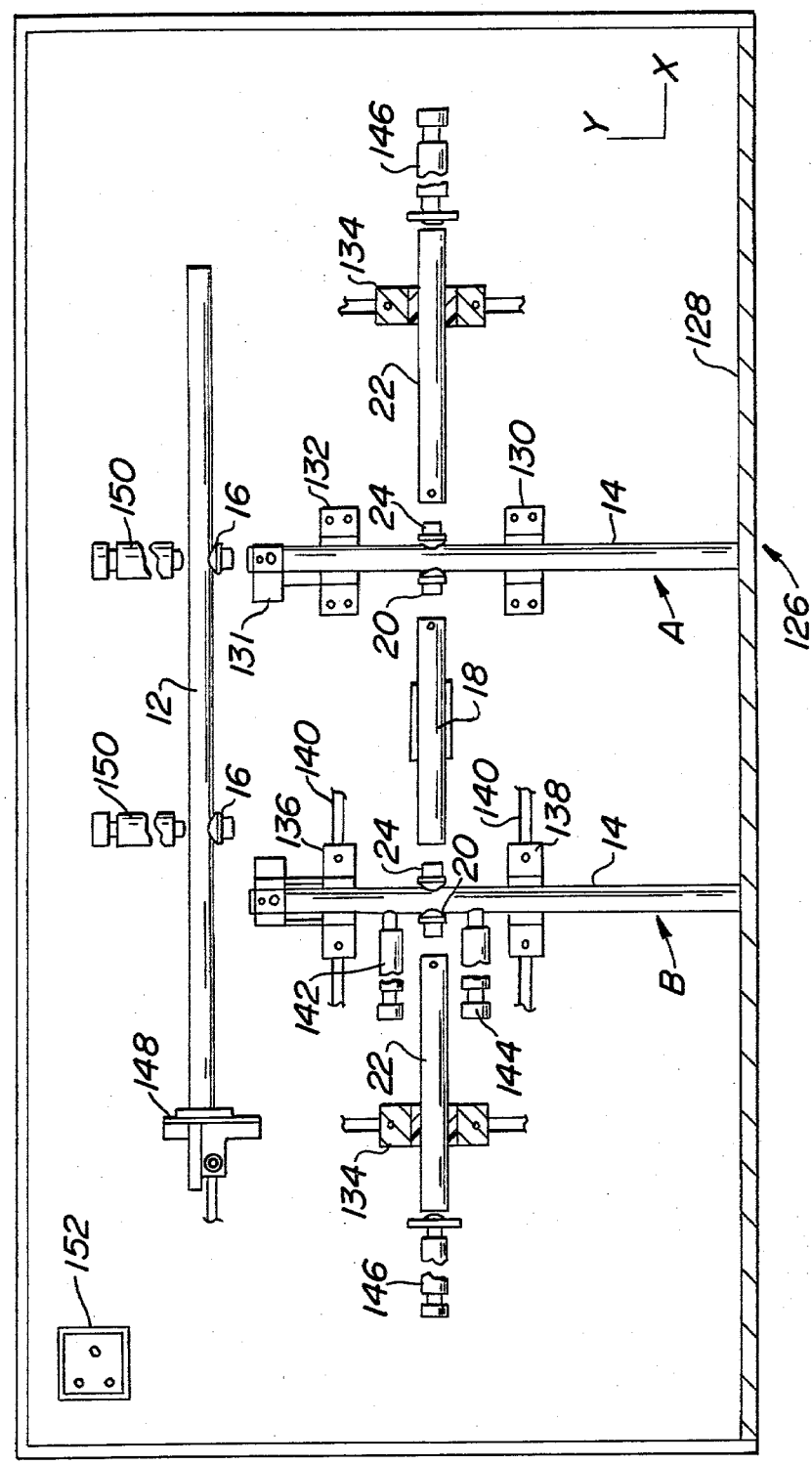
FIG. 13 is a top plan view of an assembly table for automatically assembling the railing in accordance with the present invention.

Referring to FIG. 13, there is illustrated one arrangement of a semi-automatic assembly table designated generally as 126 which may be used to fabricate the railing 10. A post member 14 (hereinafter referred to as post member A) is preassembled so as to have the fittings 20, 24 welded thereto and is positioned against the end stop 128 within guides 130, 132 adjustable along the Y axis. Rail member 22 is positioned within the guide 134, which is adjustable along the X or Y axis, so as to be aligned with the fitting 24. In order that fitting 24 is properly orientated for receiving the rail member 22, the guide 132 includes an orientation member 131 which enters the hole 43 in the upper end of the post member A.

Another post member 14 (hereinafter referred to as post member B) is mounted in guides 136, 138 which are reciprocably guided along the X axis by slots 140 in the table 126. A rail member 18 is disposed between the post members A and B. Cylinders 142, 144 are provided for pushing the post member B toward the post member A. On the lefthand side of FIG. 13, there is provided another guide 134 containing a rail member 22 aligned with one of the fittings on the post member B. Guide 134 is adjustable along the X or Y axis. A separate cylinder 146 is provided adjacent the free end of each of the rail members 22.

A stop 148, adjustable along the X or Y axis, is connected to the table 126. The stop 148 is guided by way of a slot in table 126 so as to properly position one end of a rail member 12. Rail member 12 may be preassembled so as to have fittings 16 welded thereto. Alternatively, fittings 16 can be welded to rail member 12 with the aid of members 131 after rail members 18, 22 have been press fitted to their fittings 20, 24. The rail member 12 is movable toward the adjacent end of the post members A and B by way of cylinders 150. A control panel 152 may be provided on the assembly table 126 with appropriate buttons to initiate assembly of the railing section. The table 126 has slots such as T-slots across its width and length as indicated by the X and Y axes but for simplicity of illustration such slots are not shown in the drawing. Thus, slots 140 extend across the table 126 along the X axis. Guides, such as guide 134, can be selectively locked to the table at a desired location thereon.

With rail and post members arranged on the assembly table 126 as shown in FIG. 13, cylinders 142, 144 are activated to move post member B and rail member 18 toward post member A until rail member 18 is telescoped over the extension portion of the fittings 20, 24 with or without a press fit. Then cylinders 150 are activated to move rail member 12 toward the post members until each post member is telescoped over the extension portion of a fitting 16 with or without a press fit. Then cylinders 146 are activated to move the rail members 22 until they telescope over the extension portion of a fitting on one of the post members A and B without or without a press fit. Thereafter, each post member is preferably arc spot welded through the hole adjacent its end to its associated fitting 16 and the rail members 18, 22 are arc spot welded through a hole adjacent ends thereof to the associated fitting. If desired, another hole may be provided in the rail member opposite hole 42 whereby the rail members may be arc spot welded or otherwise joined to their fitting at diametrically opposite locations. Thereafter, the railing section is removed, and the process is repeated. Preassembly of a railing section on table 126 may include only one post member, two post members as shown, or more than two post members.

An internal weld as disclosed herein was made under the following conditions. Hole 30' had a diameter of 1.23 inches and was filled with weld 40. The welder was a Lincoln arc welder set at 130 amps. and had $\frac{1}{8}$ inch 6013 mild steel welding rods. The rail member was $1\frac{1}{2}$ inch diameter sch. 40 A 120 steel pipe. There was no apparent deviation from a straight edge along a 3 foot length of the steel pipe. Hence, no post weld straightening was needed.

Another fitting wherein hole 30' was 1.4 inches in diameter was welded to another piece of said steel pipe. A measurable deviation of 0.07 inches was noted. The process was repeated to join the pipes by the cope and weld method (cope sleeve and pipe OD of 1.9 inches). A deviation of 0.23 inches was measured when the setting was 130 amps and a deviation of 0.156 inches was measured when the setting was 100 amps. I therefore conclude that measurable deviation requiring straightening can be avoided by maintaining the internal weld diameter below about $\frac{1}{4}$ the circumference of the rail or post member outer diameter.

As described above, the welds such as welds 40, are localized to minimize distortion. The transverse circumferential dimension of the area of the post member directly exposed to the weld heat is less than about 25% of the outer circumference of the post member. This limits the amount of heat directly imposed on the post member and reduces the volume of heated metal in the post member which sets up the distorting contractional forces acting thereon. Hence, as in comparison to the cope and weld method, the amount of pipe herein that remains available to restrain these contractional stresses is increased. The smaller the diameter of the weld zone, the smaller the leverage forces which cause distortion. If the weld zone's transverse circumferential dimension is more than $\frac{1}{3}$ of the way around the circumference of the post member, there is insufficient metal in the remainder of the post member's circumference to resist weld contraction.

In the present invention, the maximum transverse dimension of the weld zone is defined by hole 30' which has a diameter of about a maximum of $1\frac{3}{8}$ inches when the post circumference is about 6 inches. By eliminating all visually detectable distortion, uniform visual appearance and the integrity of the desired angular interrelationships are maintained. Also, undistorted fabricated assemblies can be installed in less time at a lower cost.

The rail and post members may be hollow as shown or may be solid. Since the welds joining the fittings to said members are internal waterproof joints, rust is not a factor whereby the rail and post members may be made of steel. Hole 42 or 43 could be closed by a rivet or other fastener to affect the joint or could be eliminated if extension portion 28 is force-fit to its mating member. Such force fit renders the mating surfaces waterproof and increases both the static and dynamic joint strength.

If welds 40 and 40' are automated by use of arc spot welding, the MIG welding head will be fixtured so as to orbit, thus producing a plug weld in 40 and a fillet ring weld in 40'. If a plug weld is desired in 40 or 40' without the use of orbiting techniques, this can be accomplished by automatically increasing the wire feed rate and weld temperature as the welding head is withdrawn from the interior of the fitting. If the head 26 is manufactured solid (hole 30 is not provided), then resistance welding can be utilized. In this case, the entire transverse wall of the fitting will be welded to either post or rail by introducing the electrode through the hollow extension portion 28 on the fittings until it contacts the transverse wall.

While the rail and post members are illustrated as being cylindrical in section, they and their fittings may be rectangular in section. If rectangular in section, the fitting heads may be tapered. If the heads are tapered, the taper may be on two faces or on all four faces. Guard plate 72 can be provided as part of each of the railings disclosed herein. If desired, each post member may have a mounting flange at its lower end.

The present invention significantly reduces the cost of manufacture of the railing. The contributing factors are the relative ease of manufacture and low cost of the fittings, a significant decrease in the time and cost of making the welds, eliminating grinding and finishing operations as well as elimination of the need for post-welding straightening operations previously necessitated by weld heat distortion.

By providing good access to the base metals (pipe and fitting), welds are produced with properly fused joints between the pipe and fittings. This ability to produce sound and uniform welded joints assures high dynamic and static strength. The base metal in aluminum joints will not lose as much of its temper upon welding as with other methods due to the minimizing of weld heat and thus preserving base metal strength. The weld as disclosed herein will also assure pipe base metal failure before weld metal or fitting base metal failure.

Adjustable quantitative control over weld strength, heat distortion, and base metal strength loss is accomplished by varying the size of the welds within the fitting. This is regulated by varying the cross-sectional area and depth of the hole 30 up to a maximum size as shown by 30' when the fittings are manufactured. The configuration of hole 30 or 30' serves as a template for confining the flow of the molten weld deposit thereby forming uniform welds. Rigid production quality control is produced for the above-mentioned factors without the expense of constant in-factory inspection.

The tapered portion 32 on fitting 16 increases the exposed portion of the circumference of top rail member 12, thus increasing the surface area available to be grasped by a person as compared with prior art. A person sliding his hand along the top rail member has more hand clearance at the joint with a post member and is less likely to loose contact with the rail member. Hence, there is an increased safety factor.

In addition to the varying designs of railings, trusses, and the like which can be achieved, the present invention produces esthetically attractive and uniform joints which contribute to the overall esthetics of the structure with positive detailing. The vertical and horizontal components of the railing can be visually separated because of the fitting whereby the top rail members appear to float and such separation can be enhanced by contrasting colors.

The present invention may be embodied in other specific forms without departing from the spirit or essential attributes thereof and, accordingly, reference should be made to the appended claims, rather than to the foregoing specification, as indicating the scope of the invention.

I claim:
1. A railing comprising:
 (a) an upright post member,
 (b) a rail member disposed at an angle with respect to the longitudinal axis of said post member,
 (c) a fitting having a head at one end and a reduced diameter hollow extension portion at its other end, said head having a concave end face shaped to mate with and being in contact with the outer periphery of one of said members, the radius of curvature of said end face being approximately the same as the radius of curvature of the outer periphery of said one member, said head having a tapered outer peripheral surface which converges to said end face, at least a portion of the end face having a radial dimension greater than the wall thickness of said extension portion,
 (d) a weld within the periphery of said head and joining said end face to said one member with a joint, said weld being exposed only on the inner periphery of said fitting, and
 (e) said other member being telescoped with respect to said extension portion and joined thereto.

2. A railing in accordance with claim 1 wherein said fitting has a cylindrical surface at the end of the head adjacent said extension portion, the diameter of said cylindrical surface corresponding to the outer diameter of said other member and forming a continuation of the outer diameter of said other member.

3. A railing in accordance with claim 1 wherein said other member is joined to said extension portion with a force fit.

4. A railing in accordance with claim 1 including a pair of rail members connected to said post member by fittings corresponding to said first-mentioned fitting and at a location remote from said first-mentioned rail member.

5. A railing in accordance with claim 1 wherein said rail member is disposed at an acute angle with respect to the longitudinal axis of said post member, said fitting having an end face lying along an axis at an acute angle with respect to the longitudinal axis of said post member.

6. A railing in accordance with claim 1 wherein said reduced diameter portion defines a shoulder on said head surrounding said extension portion, the radial dimension of said shoulder corresponding generally to the radial thickness of said other member, the outer diameter of said head corresponding generally to the outer diameter of said post member, said other member having a hole adjacent an end portion thereof, and a weld joining said other member to said fitting in said hole.

7. A railing in accordance with claim 1 including a second rail member connected to said one member by a second fitting identical with said first-mentioned fitting, said two rail members being parallel.

8. A railing in accordance with claim 1 wherein said fitting head has a transverse wall at its junction with an end of said extension portion.

9. A railing in accordance with claim 1 wherein said joint is waterproof.

10. A railing in accordance with claim 1 wherein said end face is generally elliptical in plan view.

11. A railing in accordance with claim 10 wherein the entire surface of said end face is shaped to mate with said one member.

12. A railing comprising:
(a) a post member,
(b) a rail member disposed at an angle with respect to the longitudinal axis of said post member,
(c) a one-piece fitting having a head at one end and a reduced diameter hollow extension portion at its other end, said head having an end face shaped to mate with and being in contact with the outer periphery of one of said members, said head having a tapered outer peripheral surface which converges to said end face of said head, said head having a radially outwardly directed shoulder adjacent to and surrounding said extension portion,
(d) a weld within the inner periphery of said head and joining said end face to said one member, said weld being exposed only on the inner periphery of said fitting, and
(e) said other member being telescoped over said extension portion to said shoulder, said other member having an outer diameter corresponding to the diameter of said tapered surface at the end of the tapered surface remote from said end face.

13. A railing in accordance with claim 12 wherein said head has a hole extending from said end face to said extension, said hole having a diameter not larger than the inner diameter of said extension.

14. A railing in accordance with claim 12 including a pair of rail members connected to said post member by fittings which are the same as said first mentioned fitting and at a location remote from the first mentioned rail member, said one member being the first mentioned rail member.

15. A fitting comprising a one-piece head and hollow extension portion, said extension portion projecting from one end of said head, an end face at the other end of said head, said head having an external shoulder coaxial with said extension, said head outer surface converging from a diameter corresponding to the outer diameter of said shoulder to said end face, said end face being concave, at least a portion of the end face having a radial dimension greater than the wall thickness of said extension portion.

16. A fitting in accordance with claim 15 wherein the depth of the concavity of the end face divided by the width of the concavity is less than about 0.25.

17. A fitting in accordance with claim 15 wherein said head has an axial hole extending from said end face to said extension.

18. A fitting in accordance with claim 15 wherein the concavity of the end face is generally elliptical in plan view.

19. A railing in accordance with claim 12 wherein said end face is concave and generally elliptical in plan view, the depth of the concavity of the end face divided by the minor diameter of the elliptical concavity is less than about 0.25.

20. A railing in accordance with claim 12 wherein said end face of said fitting is a flat surface and said periphery of said one member is a flat surface.

21. A railing in accordance with claim 12 wherein said end face is concave and the depth of the concavity of the end face divided by the width of the concavity is less than about 0.25.

22. A railing in accordance with claim 12 wherein said head has an axial hole extending from said end face to said extension.

23. A railing in accordance with claim 12 wherein said end face is concave and generally elliptical in plan view.

24. A railing in accordance with claim 23 wherein the entire surface of said end face is shaped to mate with said one member.

* * * * *